(12) United States Patent
Malkamaki et al.

(10) Patent No.: US 8,717,999 B2
(45) Date of Patent: May 6, 2014

(54) METHOD AND APPARATUS FOR COMMUNICATING SCHEDULING INFORMATION FROM A UE TO A RADIO ACCESS NETWORK

(75) Inventors: Esa Malkamaki, Espoo (FI); Benoist Sebire, Tokyo (JP)

(73) Assignee: Nokia Corporation, Espoo (FI)

(*) Notice: Subject to any disclaimer, the term of this patent is extended or adjusted under 35 U.S.C. 154(b) by 135 days.

(21) Appl. No.: 13/455,517

(22) Filed: Apr. 25, 2012

(65) Prior Publication Data

US 2012/0207117 A1 Aug. 16, 2012

Related U.S. Application Data

(63) Continuation of application No. 11/289,664, filed on Nov. 28, 2005, now Pat. No. 8,189,615.

(60) Provisional application No. 60/638,903, filed on Dec. 23, 2004.

(51) Int. Cl.
*H04W 4/00* (2009.01)
(52) U.S. Cl.
USPC .......................................................... 370/329
(58) Field of Classification Search
USPC .............. 370/310, 310.2, 320, 329, 335, 341, 370/342, 431, 436
See application file for complete search history.

(56) References Cited

U.S. PATENT DOCUMENTS

| | | | |
|---|---|---|---|
| 6,307,867 B1 | 10/2001 | Roobol et al. | |
| 6,775,284 B1 | 8/2004 | Calvignac et al. | |
| 6,807,192 B2* | 10/2004 | Terry | 370/469 |
| 7,039,030 B2* | 5/2006 | Terry | 370/335 |
| 7,190,684 B2 | 3/2007 | Cao et al. | |
| 7,391,758 B2 | 6/2008 | Matusz | |
| 7,810,007 B2* | 10/2010 | Herrmann | 714/746 |
| 2003/0039270 A1 | 2/2003 | Chang et al. | |
| 2003/0081635 A1 | 5/2003 | Ando et al. | |
| 2003/0095504 A1 | 5/2003 | Ogier | |
| 2003/0214906 A1 | 11/2003 | Hu et al. | |
| 2004/0042436 A1 | 3/2004 | Terry et al. | |
| 2004/0184417 A1 | 9/2004 | Chen et al. | |
| 2005/0047416 A1 | 3/2005 | Heo et al. | |
| 2005/0053035 A1 | 3/2005 | Kwak et al. | |

(Continued)

FOREIGN PATENT DOCUMENTS

| | | |
|---|---|---|
| EP | 1209936 | 5/2002 |
| EP | 1363428 A2 | 11/2003 |

(Continued)

OTHER PUBLICATIONS

LG Electronics Inc., "Control Information Transfer in MAC Layer", 3GPP TSG-RAN WG2 Meeting #45, R2-042462, Yokohama, Japan, for discussion and decision; Nov. 15-19, 2004 (4 pages).

(Continued)

*Primary Examiner* — Anh Ngoc Nguyen
(74) *Attorney, Agent, or Firm* — Harrington & Smith

(57) ABSTRACT

A method by which a UE device and a Node B communicate information such as scheduling information to each other, including a step of sending the information as part of a communication signal instead of padding in the communication signal if the information can be fit by removing all or part of the padding.

20 Claims, 2 Drawing Sheets

(56) References Cited

U.S. PATENT DOCUMENTS

| | | |
|---|---|---|
| 2005/0063345 A1 | 3/2005 | Wu et al. |
| 2005/0135329 A1 | 6/2005 | Lee et al. |
| 2005/0185608 A1 | 8/2005 | Lee et al. |
| 2006/0072504 A1 | 4/2006 | Hu |
| 2008/0137564 A1 | 6/2008 | Herrmann |

FOREIGN PATENT DOCUMENTS

| | | |
|---|---|---|
| EP | 1566925 A2 | 8/2005 |
| JP | 05-347630 | 12/1993 |
| JP | 07-312600 | 11/1995 |
| JP | 11-112573 | 4/1999 |
| JP | 2003-143217 | 5/2003 |
| JP | 2004-200923 | 7/2004 |
| WO | 2004/042993 | 5/2004 |

OTHER PUBLICATIONS

Nokia, "Discussion on MAC-e multiplexing and padding", 3GPP TSG-RAN WG2 Meeting #44: R2-042156, Sophia Antipolis, France; Oct. 4-8, 2004, Agenda item 6.2, for discussion (2 pages).
Samsung, "ETFCS configurations", R2-042380 3GPP, TSG RAN2 Meeting #44, Shin Yokohama, Japan; Nov. 15-19, 2004, Agenda item 12.2 (6 pages).
Qualcomm, "Rate-request discussion report", 3GPP TSG-RAN WG2 Meeting #45; R2-042667. Document for Discussion, Decision; Yokohama Japan; Nov. 15-19, 2004, Agenda Item 12.2 (6 pages).
Motorola et al., "MAC-e/es header and functional split", 3GPP TSG RAN WG2 Meeting #45; R2-042360, Yokohama, Japan; Nov. 15-19, 2004, Agenda Item: Enhanced Uplink (2 pages).
Motorola, "Buffer occupancy and Uplink signalling for MAC-e/es architecture", TSG RAN WG2 Meeting #45, R2-042358, Yokohama, Japan; Nov. 15-19, 2004, Agenda item 12.2 (Enhanced Uplink) (6 pages).
English Abstract of Japanese Publication No, 11-112573, published Apr. 23, 1999, Sony Corp. (1 page).
English Abstract of Japanese Unexamined Patent Publication No. 2004-200923, published Jul. 15, 2004 (1 page).
English Abstract of Japanese Unexamined Patent Publication No. 7-312600, published Nov. 28, 1995 (1 page).
English Abstract of Japanese Unexamined Patent Publication No. 2003-143217, published May 16, 2003 (1 page).
English Abstract of Japanese Unexamined Patent Publication No. 11-112573, published Apr. 23, 1999 (1 page).
English Abstract of Japanese Unexamined Patent Publication No. 5-347630. published Dec. 27, 1993 (1 page).
3GPP TS 25.321 v6.2.0 (Jun. 2004);Technical Specification; 3rd Generation Partnership Project; Technical Specification Group Radio Access Network; Medium Access Control (MAC) protocol specification (Release 6), (61 pages).

\* cited by examiner

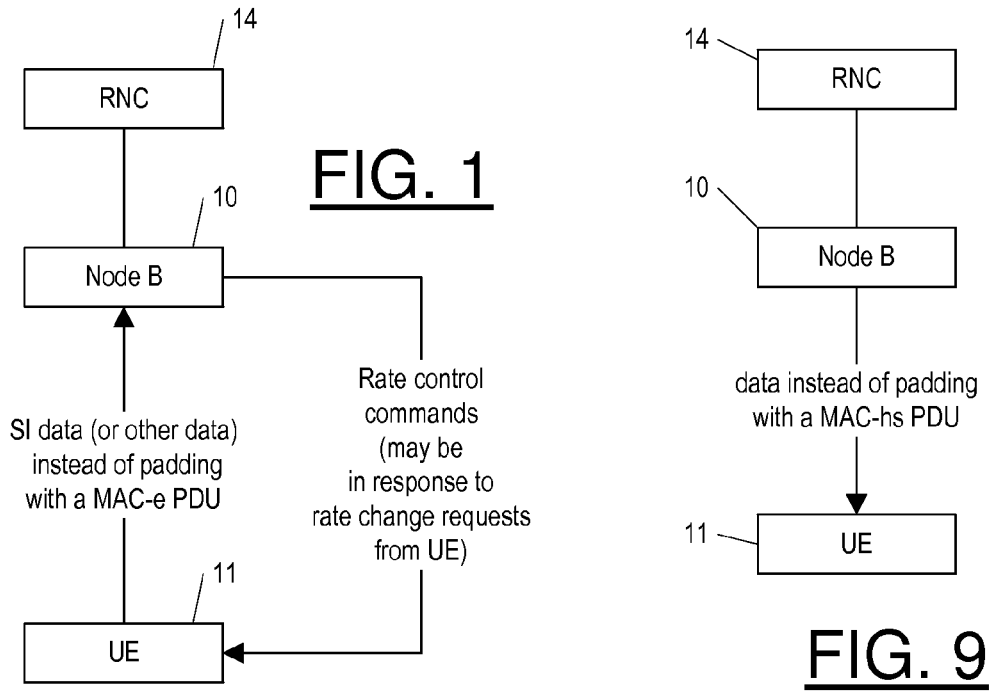
FIG. 1
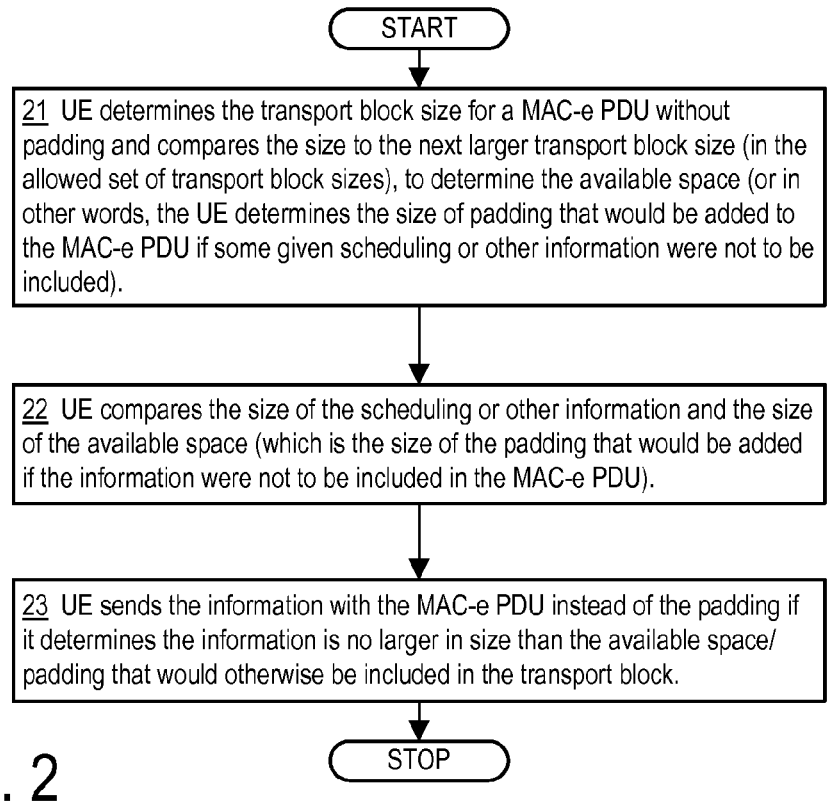
FIG. 9
FIG. 2

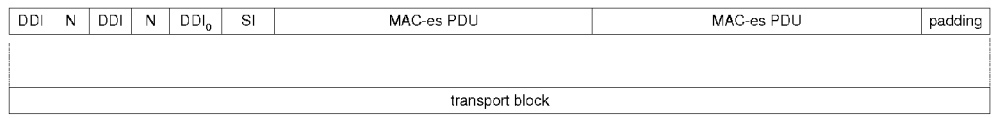
FIG. 3 SI at the end of header instead of padding
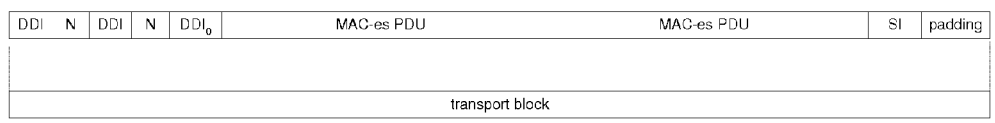
FIG. 4 SI at the end of PDU instead of padding
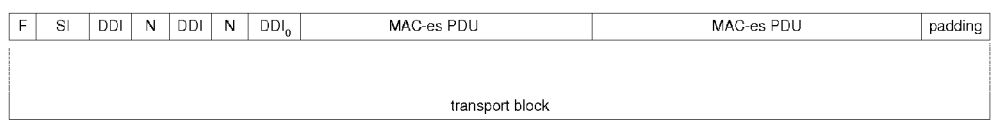
FIG. 5 SI at the beginning of PDU
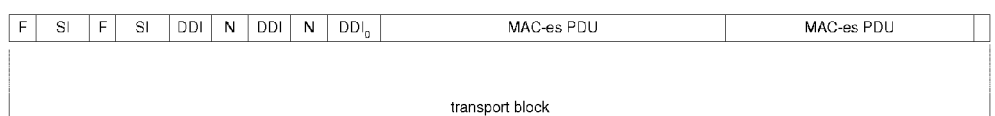
FIG. 6 SI at the beginning of PDU, variable size SI
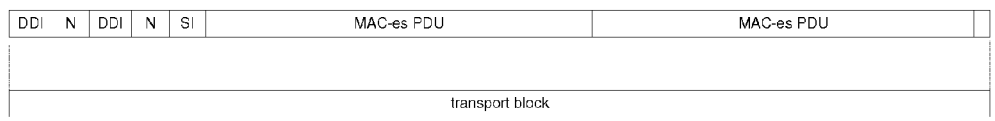
FIG. 7 SI at the end of header instead of padding, DDI0 not added because less than 6 bits padding
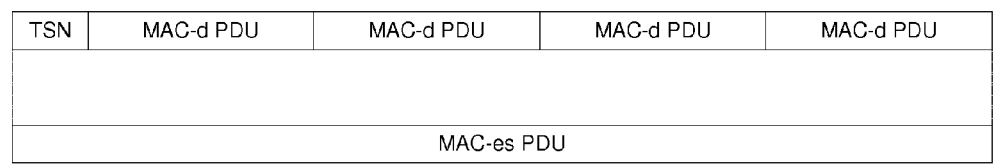
FIG. 8 MAC-es PDU with TSN and four (N=4) MAC-d PDUs

METHOD AND APPARATUS FOR COMMUNICATING SCHEDULING INFORMATION FROM A UE TO A RADIO ACCESS NETWORK

CROSS REFERENCE TO RELATED APPLICATION

This application is a continuation of application Ser. No. 11/289,664 filed Nov. 28, 2005 that claims the benefit of U.S. Provisional Application No. 60/638,903, filed Dec. 23, 2004.

BACKGROUND OF THE INVENTION

1. Technical Field

The present invention pertains to the field of wireless communication, especially via telecommunication networks according to 3GPP specifications. More particularly, the present invention pertains to uplinking or downlinking of packets in a UMTS radio access network, such as per HSUPA or HSDPA.

2. Discussion of Related Art

The present invention concerns the use of a data channel anticipated to be made available in WCDMA (Wideband Code Division Multiple Access) cellular networks—namely E-DCH (Enhanced-Dedicated Channel), an enhanced uplink channel. The WCDMA air interface is referred to as the UMTS (Universal Mobile Telecommunications System) terrestrial radio access network (UTRAN), specified by the third-generation partnership project (3GPP). E-DCH enhances the performance of the uplink compared to Release '99 of WCDMA (Rel99), reducing the delay and possibly increasing the capacity of the system. E-DCH is used by the so-called high speed uplink packet access (HSUPA) of UTRAN.

Per 3GPP, any UTRAN includes typically several radio network controllers (RNCs), each controlling several so-called Node Bs—also known as base stations. A UE (user equipment) device, such as a mobile phone, is allowed to uplink up to but not exceeding a maximum allowable rate or power that is communicated to the UE device by the Node B serving the UE device (a.k.a. the serving Node B). The serving Node B uses so-called scheduling information provided by the UE (and also the current availability of the network resources) to determine the maximum allowable rate or power the UE can use for uplink. The UE holds the data (packets) for uplink in a buffer until the packets are successfully communicated to the Node B. One example of scheduling information is how full the UE buffer is. Another is power status information.

Scheduling information is, per the prior art, communicated by the UE to the serving Node B either when event triggered (e.g., when the buffer content increases above some threshold), or periodically (e.g., every 50 ms), or when the UE is from time to time polled by the serving Node B. The scheduling information is sent in a so-called MAC-e PDU header (a header of a media access control layer-enhanced functionality protocol data unit) when there is also data to be sent (as opposed to the scheduling information), or as a separate MAC-e control PDU (which in practice may be a MAC-e PDU header without data).

Scheduling information requires some overhead (an overhead of 1-5 octets has been proposed) in the MAC-e PDU header, and therefore should not be sent too often (so as to avoid using up valuable UTRAN capacity). On the other hand it is advantageous, from the standpoint of optimizing use of a UTRAN, for a serving Node B of the UTRAN to get frequent reports of at least some scheduling information.

Thus, what is needed is a way for a UE device to frequently provide scheduling information to its serving Node B but to do so without using undue network capacity. Ideally, the way to do so could also be used to communicate not only scheduling information but also other kinds of information, and could be used not only in uplink (UE to Node B) but also in downlink.

DISCLOSURE OF INVENTION

Accordingly, in a first aspect of the invention, a method is provided comprising: a step in which a wireless communication device creates or obtains information for inclusion in a communication signal to be transmitted to another wireless communication device according to a protocol requiring the communication signal to have a fixed size selected from a set of possible fixed sizes and padded as necessary to have the selected fixed size; and a step in which the wireless communication device sends the information whenever there is room for the information in the communication signal before padding the communication signal.

In accord with the invention, the wireless communication device may determine whether there is room for the information by comparing the size of the information with the difference between the size of the communication signal before any padding and the selected fixed size of the communication signal.

The invention also provides a UE device able to communicate information to a Node B according to the method, and a Node B able to communicate information to a UE device according to the method, and also a system including a UE device and a Node B, at least one of which is able to communicate information to a Node B according to the method. The information may be scheduling information or other kinds of information.

A computer program product for providing the information according to the method is also provided, as well as an ASIC (application specific integrated circuit).

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram/flow diagram of a UE communicating scheduling information (or other information) to a Node B, according to the invention.

FIG. 2 is a flow chart of a method according to the invention by which a UE communicates scheduling information to a Node B.

FIGS. 3-8 are data diagrams indicating different possible locations for inserting scheduling information into a MAC-e PDU, according to the invention.

FIG. 9 is a block diagram/flow diagram of a Node B communicating information to a UE device, according to the invention.

BEST MODE FOR CARRYING OUT THE INVENTION

A fixed set (or a few fixed sets) of transport block sizes (TBS) will be (or may recently have been) specified for E-DCH by 3GPP for HSUPA. It is likely then that when a MAC-e PDU has been constructed by a UE, the UE will select the smallest TBS equal to or larger than the MAC-e PDU size. According to the prior art, if the TBS is larger than the MAC-e PDU, then padding is added. According to the invention, scheduling information may be sent instead of padding whenever the size of the padding is more than the size of the scheduling information. In some embodiments of the invention, the sending of scheduling information instead of padding would be in addition to sending scheduling information as in the prior art, i.e. scheduling information would be sent not only when the size of the padding permits, but also per event triggering, or polling by the serving Node B, or per a schedule so that the scheduling information is sent to the serving Node B periodically.

In the UE, an E-TFC (E-DCH transport format combination) selection algorithm typically selects which data are to be sent based on the allowed data rate (limited by the Node B), the allowed power offset for E-DCH (regulated by the Node B), and the available data in the buffers. When the amount of selected data and the related amount of headers are calculated, the E-TFC selection algorithm can and always then does calculate the amount of required padding. If some other trigger for scheduling information (e.g., buffer or power above some threshold, or time for periodic reporting, or base station polling for scheduling information) is present, scheduling information is added to the header because of the trigger. However, if no other trigger is present, the amount of padding calculated by the E-TFC selection algorithm as needed to fill the transport block is used to determine whether to include scheduling information in the MAC-e PDU (and possibly which scheduling information, in case of different kinds of scheduling information having possibly different lengths).

In one embodiment, the scheduling information (SI) is conveyed by a single fixed-length SI data item/field, and if the amount of padding is larger than the SI field length, then the SI data item is always added to the MAC-e PDU in place of at least a portion of the padding equal in size to the SI data item/field.

In another embodiment, the size of the SI data item/field—i.e. the SI field length—can vary depending on the scheduling information being reported, and in particular there could be different SI field lengths for (sets of) different scheduling information, and if the amount of padding is larger than at least the smallest of the different SI field lengths, then the largest possible SI data item is always added (i.e. the largest SI data item not larger than the amount of padding). As a result, the information reported in the SI field depends on the size of the padding: the larger the padding, the more the information. Both the UE and the Node B know how much padding is used. Thus both know the length of the SI field.

Note that the E-TFC selection algorithm has to calculate the amount of padding anyway, i.e. not only to report scheduling information according to the invention: a specific DDI (data description indicator) field has to be added to a MAC-e PDU header if the amount of padding without such a field were 6 or more bits, and so it is always necessary to determine the size of the padding, irrespective of the invention.

As an example, assume that the SI field length is two octets, i.e. 16 bits. The E-TFC selection algorithm knows—based on allowed data rate and/or allowed power offset and based on the highest priority data available in the buffer—the maximum allowed transport block size. The E-TFC selection algorithm then first—but only if some trigger is present—fills the transport block with the SI field (assuming that MAC-e level control has higher priority than other data/control in data buffers), and then takes the highest priority data from the buffer and after that, the next highest priority data, until no more data fits into the transport block. Then the E-TFC selection algorithm calculates the amount of padding needed to fill the smallest possible transport block. If the required padding is more than 16 bits (in this example) and the SI has not yet been included in the MAC-e PDU, then the SI is placed in the MAC-e PDU instead of (at least a portion of) the padding. After doing so, the E-TFC still checks whether the special DDI field is needed to tell that the rest of the transport block is padding.

As another example, assume that the SI field lengths are one and two octets: one octet for reporting (e.g.) buffer status only and two octets for reporting (e.g.) buffer status and power status. The E-TFC scheduling algorithm calculates the amount of padding needed to fill the smallest possible transport block. If the required padding is at least 8 bits (in this example) and the SI has not yet been included in the MAC-e PDU, then the SI indicating buffer status is added there (8 bits long). If the required padding is at least 16 bits, then the SI conveying power and buffer status is placed in the MAC-e PDU instead of (at least a portion of) the padding (16 bits long). After doing so, the E-TFC scheduling algorithm still checks whether the special DDI field is needed to tell that the rest of the transport block is padding. When the Node B receives the MAC-e PDU, the Node B knows the amount of padding and therefore knows the (maximum) length of the SI added to MAC-e PDU instead of (at least a portion of) the padding (The SI could be a little smaller than the padding, and so the length of the SI would not then exactly equal that of the padding, but since there would be a fixed relationship between the padding size and the SI size, the padding size would always indicate the SI size.)

Note that what is actually communicated over the air interface (between the UE device and the radio access network) is a MAC-e PDU including an SI data item (provided according to the invention, i.e. if there is room for it, or in other words, if there is capacity/space available sufficient to accommodate it) and possible padding. But this real padding (as opposed to the padding that would be present according to the prior art) is not the amount of padding the UE compares with the SI data item size. The UE creates the MAC-e PDU with headers and MAC-es PDUs and compares their cumulative size to the next larger transport block size. An SI data item is added if there is room for it, i.e. if TBS—headers—MAC-es PDUs equals or exceeds the SI size. After addition of an SI data item, there may still be room for some padding. So one could say either that according to the invention, the UE device sends an SI data item 'instead' of padding, or simply that the UE device sends an SI data item whenever there is space for it (which space would otherwise be filled with padding). Thus, it is possible to think of the invention as providing a UE device able to recognize an additional triggering event, namely the event of a MAC-e PDU having room/available capacity to accommodate an SI data item.

Referring now to FIGS. 1 and 2, a Node B 10 (or base station/base station transceiver/service access point of a radio access network) is shown as functioning as the serving Node B for a UE device 11. The Node B is under the control of a Radio Network Controller (RNC) 14 (also a part of the radio access network). The RNC typically controls several Node Bs, and is in turn one of several RNCs that in combination make up a radio access network. The Node B, typically based on commands it receives from the RNC, but sometimes also autonomously, sends commands that regulate uplink by the UE device. (Sometimes the commands are sent by the Node B to the UE device in response to rate change requests from the UE device.) The Node B uses scheduling information provided by the UE device in regulating the uplink, i.e. in determining what rate control commands to send to the UE device. Now according to the invention as described above, the UE device at least sometimes sends at least some scheduling information instead of padding that would otherwise be added to a MAC-e PDU (conveyed by a communication signal). As also mentioned above, in order to do so, in a first step 21 the UE device determines the size of the padding needed in building up a complete MAC-e PDU, and it does this in any case, i.e. it is not an additional step required by the invention. In a next step 22 specific to the invention, the UE device compares the padding size with the size of data indicating scheduling information the UE device might be able to include in the MAC-e PDU instead of the padding. Then in a next step 23 also specific to the invention (and as shown in FIG. 1), the UE sends the scheduling information in the MAC-e PDU instead of the padding if the UE device determines the scheduling information is smaller than or equal to the amount of padding. As explained below, the scheduling information may be indicated by a single SI data item of fixed size. Alternatively, there may be several different SI data items that might be included in the MAC-e PDU, indicating either different kinds of scheduling information (e.g. buffer size vs. power status) or different sets of information (e.g. buffer size vs. buffer size and power status). In such embodiments, the different SI data items/fields could differ in size, and the UE will typically send the largest SI data item smaller than or equal in size to the padding.

FIGS. 3-5 show possible MAC-e PDU structures with SI according to the invention, making it clear that the SI is not necessarily provided in the MAC-e PDU at the same location where the padding it replaces was located. As shown in FIGS. 3-5, a MAC-e PDU includes one or more pairs of a DDI and a quantity N, and also one or more MAC-es PDUs each of which in turn include one or more MAC-d PDUs. The DDI indicates the logical channel identifier, the MAC-d flow identifier, and the MAC-d PDU size, and each N indicates the number of MAC-d PDUs (all the same size) inside the corresponding MAC-es PDU. The MAC-es PDU consists of a (6-bit) TSN (transmission sequence number) and MAC-d PDUs (with the number of MAC-d PDUs inside one MAC-es PDU equaling N). (The size of the MAC-d PDU is known from the DDI.) Note that inside different MAC-es PDUs, the MAC-d PDUs can have a different size although within one MAC-es PDU all the MAC-d PDUs are of the same size.

In FIG. 3, SI (scheduling information) is added at the end of the MAC-e header. The receiver in the Node B first reads the DDI and N (the number of MAC-d PDUs in the MAC-es PDU) and then calculates the corresponding MAC-es PDU size (the size being given by 6+N*MAC-d_PDU_size in bits, where MAC-d_PDU_size is the MAC-d PDU size indicated by DDI) and finally compares the MAC-es PDU size to TBS (the transport block size), which is signaled on E-DPCCH (also called E-TFI, i.e. the enhanced transport format indicator). Since there is room for another DDI, the receiver reads another DDI and since the DDI is not 111111, N is read too, and the corresponding MAC-es PDU size is again calculated (=6+N*MAC-d_PDU_size in bits). Now the total size of the MAC-es PDUs and the corresponding header parts is compared to TBS. The comparison shows (in this example) that there is still room for another DDI. Therefore, the receiver reads another DDI. The receiver finds that the next DDI is 111111 (=$DDI_0$, the special value of DDI to indicate that rest is padding), and so the rest should be padding according to the prior art, but if this amount of padding is more than the SI size (or one or another of the possibly several SI sizes), then the SI is placed there and the rest is padding. If not, the SI is not placed there (and instead only padding is placed there).

FIG. 4 is the same as FIG. 3, so that SI is simply added at the end of the MAC-e PDU.

FIG. 5 shows another possibility to indicate SI: a one-bit flag at the beginning of the header. Thus e.g. a flag-bit value of one (F=1) could indicate that SI is present, otherwise (F=0) SI is not present and DDI follows F. In this case, the (tentative) amount of padding is calculated as in previous cases using MAC-es PDU sizes and corresponding MAC-e header portion sizes. If this amount is larger than the SI size, then SI is added at the beginning of the MAC-e header (and the actual amount of padding is reduced).

FIG. 6 shows an alternative with two different SI data items/fields for conveying two different items of scheduling information. The two different SIs have respective (possibly different) sizes. A first flag $F_1$ when set (e.g. to 1) indicates that at least one of the two SIs follows, instead of a DDI, and a second flag $F_2$—included only if the first flag is set—indicates that a second SI is present. Using a value of 1 to indicate a set flag, if only the first SI is present, then $F_1$=1 and $F_2$=0. If both are present, both $F_1$=1 and $F_2$=1. If neither of the two SIs is present (because there is insufficient padding to accommodate either of the SIs), $F_1$=0 (and the $F_2$ is not included in the MAC-e PDU).

FIG. 7 is the same case as FIG. 3, but the amount of padding after the MAC-es PDUs is less than 6 bits, and therefore a DDI is not added but a short SI is added instead of padding (second example below).

FIG. 8 shows a prior art MAC-es PDU consisting of TSN and one or more MAC-d PDUs of the same size. The MAC-d PDU size is signaled with DDI and the number of MAC-d PDUs with N in the MAC-e PDU header.

Since the E-TFCI tells the MAC-e PDU size (including padding) and {[DDI,N],($DDI_0$)} tells the data+header size, the padding size is always known. Thus appending SI at the end (where padding normally is) works fine. By having a fixed mapping table defined as in the illustrative table 1 below, the padding size tells the SI size. In other words, the padding size (calculated from E-TFCI, DDI and N) tells which SI is put at the end of the MAC-e PDU.

TABLE 1

Fixed mapping table, indicating SI sizes corresponding to different padding sizes.

| Padding | SI |
| --- | --- |
| 4-6 bits | 4 bits buffer status |
| 7-... bits | 4 bits buffer status + 3 bits power head room |

Consider two examples.
First example: (FIG. 4)
  E-TFCI=>2212 bits MAC-e PDU
  DDI(logical channel 0, PDU size=320 bits) different from 111111, N can be read
  N=6=>320*6 for the data+6 for TSN=>2212-1926-6-6=274 bits left
  larger than 6 bits, the next DDI can be read
  DDI,N (logical channel 3, PDU size=244 bits) different from 111111, N can be read
  N=1=>244 bits for the data+6 bits for TSN=>274-250-6-6=12 bits left
  larger than 6 bits, the next DDI can be read
  DDI=111111, end of data=>padding=12-6=6 bits
  At the end of the MAC-e PDU we have 4 bits SI+2 bits padding
Second example: (FIG. 7)
  E-TFCI=>2212 bits MAC-e PDU DDI (logical channel 0, PDU size=320 bits) different from 111111, N can be read N=6=>320*6 for the data+6 for TSN=>2212-1926-6-6=274 bits left larger than 6 bits, the next DDI can be read DDI,N (logical channel 2, PDU size=251 bits) different from 111111, N can be read N=1=>251 bits for the data+6 for TSN=>274-257-6-6=5 bits left smaller than 6 bits, the rest is padding At the end of the MAC-e PDU we have 4 bits SI+1 bit padding If SI is always sent instead of (some) padding, the presence of SI in the MAC-e PDU does not need to be signaled: the right TBS/muxing combination is selected to ensure enough padding for the SI to be sent.

In some embodiments, a special value of DDI (e.g., 111110) could be used to indicate that SI follows.

Notice that if some triggering event occurs, SI will already be present in the MAC-e PDU before the UE calculates the amount of padding. In a typical embodiment of the invention in such a situation the UE would not add another SI unless it communicates different scheduling information (i.e. and so unless there are different sizes for SI).

In some embodiments, in case of only a single SI size (e.g., 16 bits), the SI is always sent when triggered as in the prior art, and, per the invention, the SI is also sent if there is room (i.e. it is sent instead of padding).

The scheduling information sent when some triggering event occurs could be different from the information sent when there is room (instead of padding). For instance, the normally triggered information (event, polling, periodic) could be total buffer status and power headroom information, whereas the information replacing the padding (or "triggered" by space available in the MAC-e PDU) could be some additional buffer status, such as buffer status for different priorities or different MAC-d flows or logical channels. Thus, whenever there is room in the transport block (which would otherwise be completed by filling unused space with padding), the UE could send the additional information. The additional information could, for example, be 3 bits for priority and 3 bits for buffer status for that priority, and as many of these 6-bit blocks (for different priorities) would be added as there is room. For instance, if there were room for 24 bits in the transport block, instead of padding the transport block with 24 bits of padding, the UE could send buffer status for 4 different priorities.

Scheduling information is here used as one example of information that could be communicated by a UE in a transport block in place of (at least some of the) padding that would otherwise be added to the transport block. There could be other information sent instead of padding whenever there is room. A good example of other information that a UE could advantageously communicate to the Node B in place of padding is implementation-related information, i.e. e.g. UE capability information (e.g. a model number and a build identifier).

In the above description, a UE uplinks information to the serving Node B in place of padding, such as for example in case of HSUPA. The same idea can also be applied to downlink, i.e. e.g. in case of HSDPA (high speed downlink packet access). In HSDPA, the transport block sizes are also fixed and therefore padding is used to fill the MAC-hs PDU. According to the invention here, the (serving) Node B could downlink some information to a UE instead of (at least some of) the padding. The Node B could for example inform the UE about buffer status of different priority queues in the Node B.

The UE could use such information in various ways, such as for example for memory allocation to different reordering queues. Since such information would only be sent when there is room, it cannot be very critical information but should instead be some additional information which might be useful for the UE to know but not absolutely necessary. Another example is Node B capability information.

Referring now to FIG. 9, the invention is shown being used in case of HSDPA, in which case the serving Node B 10 of the UE device 11 communicates information (as data bits) in a transport block along with a MAC-hs PDU instead of at least some of the padding that would otherwise be included in the transport block.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

The invention claimed is:

1. A method, comprising:
triggering, at least partially by a processor of an apparatus, an information data item if a bit size of the information data item does not exceed a bit size difference between a protocol data unit size and a total bit size of data and header bits for transport without the information data item in the protocol data unit in a wireless communication signal, and
including, by the apparatus, the triggered information data item in the protocol data unit.

2. A method as in claim 1, wherein the included information data item comprises buffer status bits/report.

3. The method as in claim 1, wherein the included information data item can be any bit size in a predetermined set of bit sizes and no information data item is included if the bit size difference is smaller in bit size than a smallest bit size in the predetermined set of bit sizes.

4. The method as in claim 3, wherein the information data item having a largest bit size smaller than or equal to the bit size difference is included.

5. The method as in claim 3, wherein the method is performed by a wireless communication device and the wireless communication signal is for transmission to another wireless communication device, and wherein there is a fixed relationship between the bit size of the included information data item and the bit size difference, and the fixed relationship is known to both the wireless communication device and the other wireless communication device.

6. The method as in claim 3, wherein a flag is included in the wireless communication signal so as to signal the presence of said information data item as present in the wireless communication signal.

7. The method as in claim 1, wherein the information data item has a fixed size.

8. The method as in claim 1, wherein the included information data item comprises scheduling information bits.

9. The method as in claim 1, wherein the method is performed by a wireless communication device and the wireless communication signal is for transmission to another wireless communication device, and wherein the wireless communication device is a wireless terminal of a radio access network and the other wireless communication device is a user equipment device, and the wireless communication signal conveys a medium access control-high speed protocol data unit.

10. A non-transitory computer readable medium embodying computer program code thereon for execution by a computer processor, wherein said computer program code includes instructions for causing the wireless communication device to perform the method according to claim 1.

11. Apparatus, comprising:
    at least one a processor; and
    at least one memory including computer program code, the at least one memory and the computer program code configured to, with the processor, cause the apparatus at least to:
        trigger an information data item if a bit size of the information data item does not exceed a bit size difference between a protocol data unit size of data and a total bit size of data and header bits for transport without the information data unit in a wireless communication signal, and
        include the triggered information data item in the protocol data unit.

12. The apparatus of claim 11, wherein the included information data item comprises buffer status bits/report.

13. The apparatus of claim 11, wherein the included information data item can be any bit size in a predetermined set of bit sizes and no information data item is included if the bit size difference is smaller in bit size than a smallest bit size in the predetermined set of bit sizes.

14. The apparatus of claim 13, wherein the information data item having a largest bit size smaller than or equal to the bit size difference is included.

15. The apparatus of claim 13, wherein the method is performed by a wireless communication device and the wireless communication signal is for transmission to another wireless communication device, and wherein there is a fixed relationship between the bit size of the included information data item and the bit size difference, and the fixed relationship is known to both the wireless communication device and the other wireless communication device.

16. The apparatus of claim 13, wherein a flag is included in the wireless communication signal so as to signal the presence of said information data item as present in the wireless communication signal.

17. The apparatus of claim 11, wherein the information data item has a fixed size.

18. The apparatus of claim 11, wherein the included information data item comprises scheduling information bits.

19. The apparatus as in claim 11, wherein the method is performed by a wireless communication device and the wireless communication signal is for transmission to another wireless communication device, and wherein the wireless communication device is a wireless terminal of a radio access network and the other wireless communication device is a user equipment device, and the wireless communication signal conveys a medium access control-high speed protocol data unit.

20. A method, comprising:
    creating or obtaining, at least partially by a processor of an apparatus, an information data item if a bit size of the information data item does not exceed a bit size difference between a bit size capacity of a protocol data unit and a bit size of transport bits for transport in the protocol data unit in a wireless communication signal, and
    including, by the apparatus, the created or obtained information data item into the protocol data unit for transport.

* * * * *